United States Patent [19]

Hayashi et al.

[11] 4,318,678

[45] Mar. 9, 1982

[54] APPARATUS FOR PRODUCING A PLURALITY OF TRAPEZOIDAL DOUGH PIECES OF THE SAME ORIENTATION FROM A WEB OF DOUGH SHEET

[75] Inventors: Torahiko Hayashi; Michio Morikawa; Sadao Shibata, all of Utsunomiya, Japan

[73] Assignee: Rheon Automatic Machinery Co., Ltd., Tokyo, Japan

[21] Appl. No.: 128,940

[22] Filed: Mar. 10, 1980

[30] Foreign Application Priority Data

Mar. 8, 1979 [JP] Japan .................................. 54-27350

[51] Int. Cl.³ .......................... B29C 17/00; A21C 5/00
[52] U.S. Cl. ..................................... 425/301; 83/302; 83/408; 99/450.1; 99/450.2; 198/399; 425/305.1; 425/306; 425/315; 425/319; 425/324.1; 425/391
[58] Field of Search .................. 425/301, 302.1, 305.1, 425/320, 321, 324.1, 207, 289, 296, 306, 315, 316, 319, 335, 391, 168; 426/439, 496, 500, 502, 503, 512; 99/450.2, 450.1; 83/302, 408; 198/399

[56] References Cited

U.S. PATENT DOCUMENTS

| | | | |
|---|---|---|---|
| 3,398,701 | 8/1968 | Elgner | 425/321 |
| 3,603,268 | 9/1971 | Wietzel | 425/168 |
| 3,704,664 | 12/1972 | Fisher | 425/321 |

*Primary Examiner*—Willard E. Hoag
*Attorney, Agent, or Firm*—Guy W. Shoup; Gerard F. Dunne

[57] ABSTRACT

An apparatus for producing a plurality of trapezoidal dough pieces of the same orientation from a web of moving dough sheet includes a first rotatable cylindrical cutter producing two kinds of series of trapezoidal dough pieces arranged in opposite orientations, one kind of series of continuous, the other separated into pieces. The series which is continuous is sidetracked upwardly, cut into pieces by a second rotatable cylindrical cutter and then reversed by passing around a curved surface and following onto the moving surface on which the dough pieces of the other series are being conveyed. The fall causes all dough pieces to have the same orientation.

12 Claims, 9 Drawing Figures

APPARATUS FOR PRODUCING A PLURALITY OF TRAPEZOIDAL DOUGH PIECES OF THE SAME ORIENTATION FROM A WEB OF DOUGH SHEET

The present invention relates to an apparatus for producing from a single web of dough sheet a plurality of trapezoidal dough pieces of the same orientation to be processed for confectionery, bread and the like. A particular feature of the present invention is found in the combination of cutting trapezoidal dough pieces into series having opposite orientations from a web of dough sheet continuously fed into the apparatus, and then changing the orientation of one series.

The dough pieces prepared and arranged according to the present invention may be processed into any desired pastry product on a continuous basis with any processing machines connected downstream of the apparatus of the present invention. An example is the production of rolled pastry product, spiral in cross-section, such as croissants or buttered rolls.

In producing croissants or buttered rolls in general, dough pieces having triangular or trapezoidal configurations are prepared in advance and thereafter rolled up from the bases of the triangular or trapezoidal dough pieces. The operation for preparing dough pieces is usually performed by cutting a broad dough sheet having a thickness, for instance, from about 2 mm to about 5 mm into triangular or trapezoidal dough pieces.

Conventionally, in order to mass produce dough pieces while minimizing losses of dough, a web of dough sheet continuously supplied is usually cut into pieces having the shape of an isosceles triangle, with the bases of the pieces positioned in parallel with the direction of advancement of dough sheet, and with any adjacent pair of triangles facing in opposite directions. Therefore, in order to roll up the triangular pieces mechanically and continuously from the bases thereof, it is required, before rolling up, to make the orientations of all the pieces uniform by an orienting device or by a manual operation. This, however, has disadvantages in that a high speed operation cannot be performed and furthermore it requires a very complex mechanism.

An object of the present invention is to resolve the above difficulty and to provide an apparatus with a simple mechanism for producing trapezoidal dough pieces of the same orientation from a web of dough sheet being continuously fed at high speed.

With the apparatus of the present invention, a web of dough sheet continuously fed into the apparatus is successively cut to provide a plurality of trapezoidal dough pieces of the same size having two kinds of positions in reverse orientations to each other, and thereafter the dough pieces of the one kind are separated from the rest while being conveyed and then overturned whereby all of the pieces can be arranged to have the same orientation.

When all of the trapezoidal dough pieces are so arranged that the long bottoms of the trapezoids can face in the direction of advancement thereof, they may be automatically rolled up by a roll-up device provided downstream of the apparatus of the present invention to form rolled masses spiral in cross-section, and the rolled masses may subsequently be processed into croissant-shaped dough products or the like.

In detail, according to the present invention, a web of dough sheet is subjected to cutting operations twice, by first and second rotatable cylindrical cutters. The dough sheet is successively cut by the first cutter on a first conveyor assembly to form two kinds of lengthwise series of trapezoidal dough pieces, the series being alternately aligned in lateral direction. The first kind of series consists of trapezoidal dough pieces of the same size and configuration interconnected head-to-tail. The second kind of series consists of trapezoidal dough pieces of the same size and configuration as those of the first kind of line, but aligned in reverse orientation and separated from each other. The two kinds of series of trapezoidal dough pieces, after being cut by the first cutter, are separated vertically from each other. The interconnected dough pieces in the first series are guided onto a rearward portion of a second conveyor assembly, which is positioned above the upper reach of the first conveyor assembly, and spaced apart therefrom by at least the thickness of the dough sheet. The upper reach of the rearward portion of the second conveyor assembly is inclined upwardly in the downstream direction. On the other hand, the separated dough pieces in the second series are conveyed on the first conveyor assembly past the rearward portion of the second conveyor assembly. The interconnected dough pieces on the second conveyor assembly are successively cut at the interconnecting portions to separate them by a second cutter positioned above and adjacent the upper reach of the second conveyor assembly.

In this connection, in order that the interconnected dough pieces can be smoothly and effectively cut by the second cutter at the interconnecting portions thereof, the conveying speeds of the first and the second conveyor assemblies are required to be the same, at least in the range between the area of the first conveyor assembly engaging the first cutter and the area of the second conveyor assembly engaging the second cutter.

The trapezoidal dough pieces separated by the second cutter are subsequently made to fall successively around a surface curved in cross-section which is provided at the foremost end of the second conveyor assembly and onto the first conveyor assembly while reversing their orientation. The foremost end of the second conveyor assembly is positioned above the upper reach of the first conveyor assembly. Thus, it will be noted that all of the trapezoidal dough pieces will eventually have the same orientation on the first conveyor assembly.

In order to effectively carry out the present invention, a falling distance of the trapezoidal dough pieces from the foremost end of the second conveyor assembly to the upper reach of the first conveyor assembly is arranged so that the pieces can land on the upper reach of said first conveyor assembly with the orientation of the dough pieces being reversed without injuring the configuration of the dough pieces.

According to the present invention, there is provided an apparatus for producing from a web of dough sheet a plurality of trapezoidal dough pieces of the same orientation, comprising a first conveyor assembly for conveying the dough sheet, comprising one or more conveyors substantially horizontally arranged, a second conveyor assembly positioned above the upper reach of said first conveyor assembly in the mid portion thereof and spaced apart therefrom by at least the thickness of the dough pieces. The second conveyor comprises one or more conveyors, including a forward portion provided at the foremost end thereof with a surface curved in cross-section and a rearward portion the upper reach of which is inclined upwardly in the downstream direction. A first rotatable cylindrical cutter is positioned on the upper reach of the first conveyor assembly in engagement therewith and upstream of the second conveyor assembly, this cutter being provided on the cylindrical surface thereof with blades adapted to cut the dough sheet into two kinds of lengthwise series of dough pieces. A first kind of series consists of trapezoidal dough pieces of the same size and orientation which are interconnected head-to-tail, and the second kind of series consists of dough pieces of the same size and configuration as those of the first kind, but aligned in reverse orientation and separated from each other.

A second rotatable cylindrical cutter is positioned on the second conveyor assembly in engagement therewith and is provided on the cylindrical surface thereof with blades adapted to cut the interconnecting portions of the interconnected dough pieces in the first series which have been guided onto the second conveyor assembly. The foremost end of the second conveyor assembly is at a level relative to that of the upper reach of the first conveyor assembly so that the trapezoidal dough pieces separated by the second cutter and conveyed by the second conveyor assembly can fall from the foremost end onto the first conveyor assembly while reversing their orientation. The conveying speeds of the first and the second conveyor assemblies are arranged to be the same, at least in the range between an area of the first conveyor assembly engaging the first cutter and an area of the second conveyor assembly engaging the second cutter.

When the leading end of the dough sheet, which is successively cut by the first cutter and conveyed by the first conveyor assembly, approaches the rearmost end of the second conveyor assembly, only the leading end of the series of interconnected dough pieces are sidetracked to the second conveyor assembly. This operation can be readily accomplished by various manual or mechanical steps. When the leading ends of the interconnected dough pieces are to be manually transported to the second conveyor assembly, the movement of the apparatus is temporarily discontinued at a proper time, and the leading ends may be picked up one by one manually, or with the aid of suitable instruments, to place them on said second conveyor assembly.

Alternatively, the leading ends of the two series may be lifted collectively by suitable means to place them on said second conveyor assembly, and thereafter the separated dough pieces in one series are separated by their own weight from the interconnected dough pieces to thus fall back onto the first conveyor assembly.

Any of the separated dough pieces whose majority portion has been substantially placed on said second conveyor assembly will be conveyed thereby, but they can be readily removed from the system by suitable guide means at appropriate places thereon.

In one embodiment of the present invention, at least the rearward portion of the second conveyor assembly may be pivotably moved in vertical directions between a position where it contacts the upper each of the first conveyor assembly and a position where it is spaced apart therefrom in order for the rearward portion to engage said second cutter. Consequently, when the rearward end takes the former position, it can automatically take up the leading end of the dough sheet which has been successively cut by the first cutter and conveyed by the first conveyor assembly, so that this leading end can ride onto the second conveyor assembly, and when the rearmost end is raised upwardly to the latter position, the separated dough pieces from one series which are about to ride onto the second conveyor assembly, are separated away by their own weight from the interconnected dough pieces of the other series to fall onto the first conveyor assembly without being capable of actually being conveyed on the second conveyor assembly. And, only the interconnected dough pieces in the other series can be conveyed on the second conveyor assembly. In this connection, it is preferable thet the rearward end of the rearward portion of the second conveyor assembly be substantially pointed to facilitate the taking up of the leading end of the dough sheet. It should be noted, however, that even if the rearward end is not pointed, the leading end can readily be taken up by the second conveyor assembly to ride thereonto, since the second conveyor assembly runs in the same direction as the first conveyor assembly so as to guide the dough pieces onto the second conveyor assembly.

The first conveyor assembly may consist of a single conveyor, but it may also comprise two or more conveyors arranged in series. In the latter case, the rearward portion of the second conveyor assembly may be positioned above the upper reach of an upstream conveyor, and the first cutter may engage the upper reach of the upstream conveyor. A further conveyor may be positioned downstream of the upstream conveyor adjacent thereto to receive the dough pieces cut by the first cutter, the conveying speed of the downstream conveyor being faster than that of the upstream conveyor. Preferably, the conveying speed of the downstream conveyor is more than twice that of the upstream conveyor, so that the trapezoidal dough pieces can be separated from each other by a distance at least equal to the longitudinal length of each piece. The speed of each of the conveyors may be adequately adjusted to suit the purpose of the present invention.

The second conveyor assembly may consist of a single conveyor, or alternatively, it may comprise a plurality of conveyors, for instance a combination of a forward conveyor and a rearward conveyor. The forward conveyor may be of any construction so long as it is appropriate for conveying dough pieces. It may be, for instance, a belt conveyor or a single roll. The forward conveyor is adjusted to have a conveying speed which is the same as or faster than that of the rearward conveyor. The foremost end of the second conveyor assembly may be positioned above the first conveyor assembly, or above any of the downstream conveyors in case there is one or more downstream conveyors.

Thus, in general, by suitably controlling the length of the upper reach of the second conveyor assembly and/or the conveying speed of the first conveyor assembly, the trapezoidal dough pieces separated by the second cutter and successively dropped from the second conveyor assembly after passing around a curved surface thereof, can be prevented from overlapping the trapezoidal dough pieces continuously fed on the first conveyor assembly.

If the second conveyor assembly consists of a forward and rearward conveyors, the above prevention of the overlapping of the dough pieces may be achieved by suitably controlling the length of the upper reach and/or the conveying speed, of the forward conveyor, together with a suitable control of the conveying speed of the first conveyor assembly, particularly any of the downstream conveyors thereof. The conveying speed of the upper reach of a portion of the second conveyor assembly downstream of the second cutter may also be arranged to change the conveying speed to meet the above end.

However, prevention of overlapping is not always required.

Thus, we can obtain trapezoidal dough pieces which are all arranged to have the same orientation with each other, and, if required, arranged to have no overlapping portions. In this instance, when the long bottom sides of the trapezoids face in the direction of advancement of the dough pieces, the dough pieces may be automatically rolled up by a roll-up device such as a conventional roll-up net to form rolled masses spiral in cross-section. However, even if the trapezoidal dough pieces partially overlap each other to present a scalelike appearance, as long as the long bottom sides of all the trapezoids face in the direction of advancement of the dough pieces, the dough pieces can be rolled up by means of a belt and roller assembly, since they can be picked up one by one from the long bottom sides thereof without interfering the subsequent partially overlapping dough pieces.

In order to ensure the cutting effects of the first and second cutters, it is preferable to provide support plates underneath the upper reaches of said first and second conveyor assemblies, respectively, where they engage said first and second cutters, respectively.

For a better understanding of the invention, reference will now be made by way of an embodiment thereof to the accompanying drawings, in which:

FIGS. 1 and 2 each shows a web of dough sheet being continuously fed from which triangular dough pieces are being cut, by the conventional cutting methods, FIGS. 1A and 2A each shows two rows of triangular dough pieces separated from the dough sheet cut by the conventional cutting methods shown in FIGS. 1 and 2, respectively.

Figures 1, 1A:
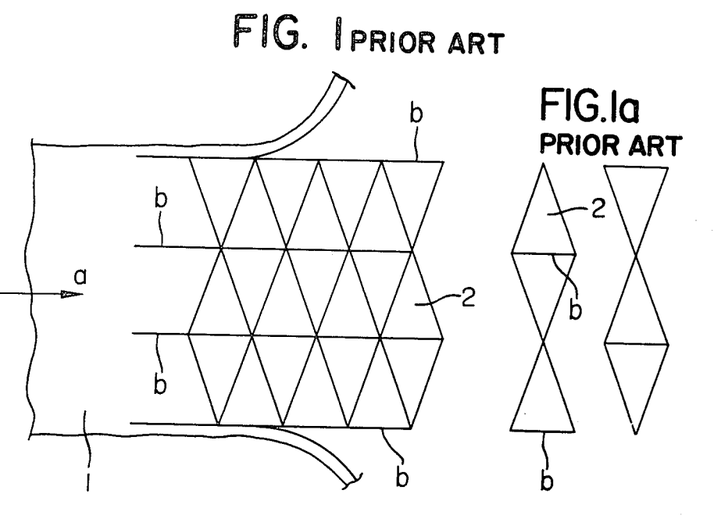
Figures 2, 2A:
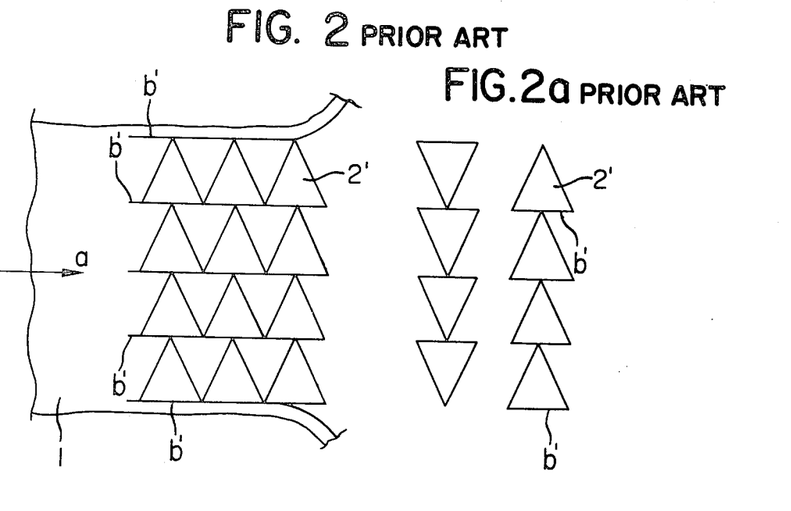

In the past, as shown in FIGS. 1 and 2, triangular dough pieces were continuously cut from a web of dough sheet continuously fed in the direction shown by the arrow (a). In both cases, the bases (b) and (b') of the triangles are in parallel with the direction of advancement (a) of the dough sheet (1) which is being continuously fed.

This arrangement has been adopted in order to facilitate the mechanical changes of orientation of the triangular dough pieces. The operation of changing the orientation of dough pieces has been performed by mechanically picking them up and overturning them, or otherwise changing their orientations. The conventional changing operation, however, has disadvantages in that it requires a very complex mechanism, and in that a high speed production cannot be achieved.

Figure 3:
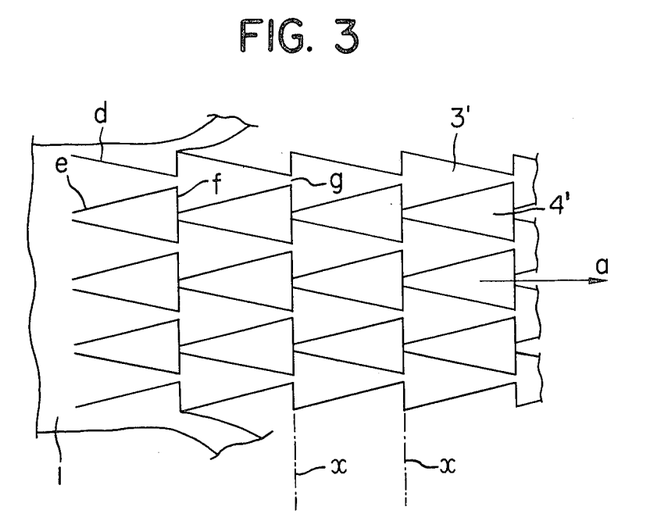
FIG. 3 shows a web of dough sheet being continuously fed from which trapezoidal dough pieces are being cut by a first cutter provided in an apparatus according to the present invention.
Figure 4:
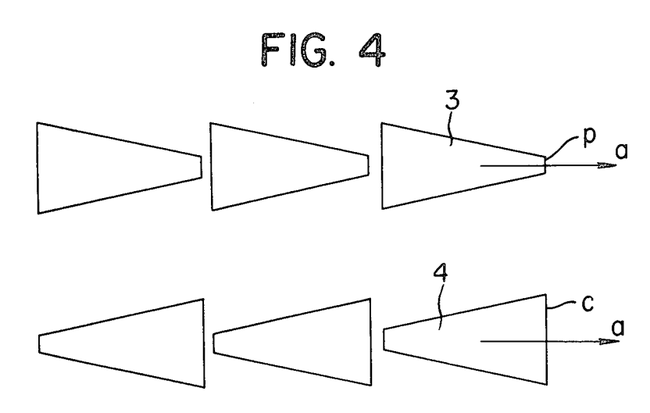
FIG. 4 is an explanatory view of two kinds of series of trapezoidal dough pieces, in which the dough pieces in each series are separated and spaced slightly apart from each other after being cut by an apparatus of the present invention.

Contrary to the conventional cutting operation shown in FIGS. 1 and 2, according to the present invention a web of dough sheet is cut in two steps by the operation of two cutters the detail of which cutting operations will be explained later with respect to FIG. 5. FIG. 3 shows a web of dough sheet cut in the first step by a first cutter in which two kinds of lengthwise series (3') and (4') of trapezoidal dough pieces are alternately aligned in lateral direction, and the lines (x) along the bases of the trapezoidal dough pieces are positioned substantially normally to the direction of advancement (a) of the dough sheet. A series (3') of a first kind consists of strips of trapezoidal dough pieces interconnected head-to-tail, and a series (4') of a second kind consists of trapezoidal dough pieces (4) separated from each other. In the second step, the first kind of series (3') of trapezoidal dough pieces are cut at their interconnecting portions to produce the trapezoidal dough pieces (3) separated from each other. Each of the dough pieces (3) in the first series (3') has a short top (p) facing in the direction of advancement of the dough sheet, while each of the dough pieces (4) in the second series (4') has a long bottom (c) facing in the direction of advancement of the dough sheet. FIG. 4 shows explanatorily the positions of trapezoidal dough pieces (3) and (4) each of which are shown separated slightly apart from each other.

Figure 5:
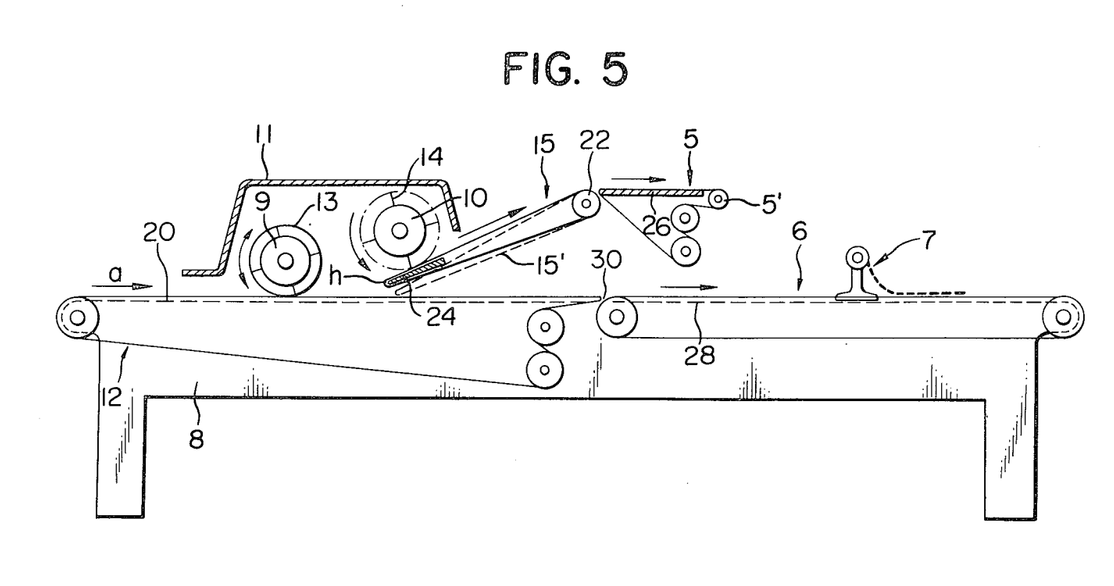
FIG. 5 is a diagramatic side view of an apparatus of the present invention.

FIG. 5 shows diagramatically an apparatus of the present invention. An upstream conveyor (12) of a first conveyor assembly is mounted on a table (8) at the left-hand side thereof in FIG. 5, and the belt of the conveyor (12) runs over a left-hand portion (20) of the upper surface, shown by the broken line, of the table (8) and is trained around several rollers which are suitably mounted on the table (8).

A first cylindrical cutter (9) is positioned above the upper surface portion (20) of the table (8) in pressing engagement with the upper flight of the belt of the conveyor (12). The peripheral speed of the cutter (9) must be the same as the running speed of the belt of the conveyor (12). The first cylindrical cutter (9) is fixed to a frame of the apparatus so as to rotate about its own axis, and is housed in a cover (11) fixed to the frame. The first cutter (9) is provided along its cylindrical surface with blades (13) arranged in a pattern capable of forming the cuts (d), (e) and (f) on the dough sheet as shown in FIG. 3, in cooperation with the belt of the upstream conveyor supported on the table (8). The cuts (d) and (e) are alternately inclined in different directions and the cuts (f) extend intermittently on the line (x), leaving spaces (g) at intervals. The cuts (d) and (e) correspond to the opposite lateral sides of the trapezoidal dough pieces (3) and (4), and the cuts (f) substantially correspond the tops and bottoms thereof. The above arrangement of the blades (13) provides series (4') of individually cut dough pieces and series (3') of dough pieces endlessly connected in the longitudinal direction.

A rearward conveyor (15) of a second conveyor assembly is positioned downstream of the cutter (9) and above the upper flight of the conveyor (12), but spaced apart therefrom by at least the thickness of the dough sheet. The rearward conveyor (15) of the second conveyor system may be fixedly mounted on the frame of the apparatus. The upper flight of the rearward conveyor (15) inclines upwardly in the direction (a) of advancement of the dough sheet. The belt of the conveyor (15) is trained around a roller (22) and a plate (24) supporting the belt at the rearward end portion of the conveyor (15), said plate (24) being fixed to the frame.

A second cylindrical cutter (10) is fixed to a frame of the apparatus so as to rotate about its own axis and is housed in the cover (11). The cutter (10) is in pressing engagement with the upper flight of the belt of the conveyor (15), and is provided on its cylindrical surface with linear blades (14) extending parallel to the axis of the cylindrical body thereof to sever the portions (g) left uncut by the cutter (9) in cooperation with the belt of the rearward conveyor supported on a plate (24) fixed to a frame of the apparatus, thereby separating the dough pieces of the series (3') into individual dough pieces (3).

As the case may be, the conveyor (15) may be arranged to be pivotable about the axis of the roller (22) such that the rearward end (h) thereof can move between a position as shown by the broken line (15') where it contacts the upper surface of the belt in the upper flight of the conveyor (12) and a position where the upper flight of the conveyor (15) engages the cutter (10). In this case, for the reasons explained later, it is preferable that the rearward end (h) of the conveyor (15) be substantially pointed to facilitate taking up by the conveyor (15) of the leading end of the dough sheet which has been successively cut by the cutter (9) and conveyed by the conveyor (12).

A downstream conveyor (6) of the first conveyor assembly is mounted on the table (8) downstream of the upstream conveyor (12) adjacent thereto so as to leave a minimal gap (30) between the opposite ends of the belts on the upper flights of the conveyors (12) and (6) thereby to facilitate the transfer of the dough pieces (4) therebetween. The belts of the conveyors (12) and (6) are arranged to pass through a slit provided in the mid portion of the upper surface of the table (8). The belt of the conveyor (6) runs over a right-hand portion (28) of the upper surface of the table (8) and is trained around several rollers which are suitably mounted on the table (8). The running speed of the belt of the conveyor (6) is adjustable and is faster than and preferably more than twice the speed of that of the belt of the conveyor (12) for the reasons mentioned later.

A forward conveyor (5) of the second conveyor assembly is positioned above the upper flight of the downstream conveyor (6) and downstream of the rearward conveyor (15) such that the upstream end of the upper flight of the conveyor (5) is close to the downstream end of the upper flight of the conveyor (15) whereby the trapezoidal dough pieces (3) separated by the cutter (10) can smoothly be transferred from the conveyor (15) onto the conveyor (5). The belt of the conveyor (5) is trained about several rollers and a support plate (26) for supporting the upper flight of the belt, which plate (26) minimizes the gap between the upper flights of the belts of the conveyors (15) and (5). Said rollers and the support plate (26) may be fixed to the frame. However, some or all of the rollers may be displaceable so as to permit extension or reduction in length of the upper flight of the forward conveyor. The support plate (26) may be replaced by a roller as the case may be. The conveying speed of the belt of the conveyor (5) is adjustable. It runs faster than that of the conveyor (15) for the reasons explained later. The forward end roller (5') of the conveyor (5) provides a surface curved in cross-section for allowing the dough pieces (3) to fall therearound onto the downstream conveyor (6).

A roll-up device (7) is mounted on the table (8), in the mid-section of the upper flight of the conveyor (6) and downstream of the conveyor (5) to roll up the dough pieces (3) and (4) carried by the conveyor (6) into rolled masses (A) spiral in cross-section.

The device (7) may be a chain-type net which is hung from a transversely extending horizontal bar held at its ends by supports fixed to the table (8), or it may be of any other type. For instance, the device can be a belt and roll assembly which is positioned adjacent the downstream end of the upper flight of the downstream conveyor (6) and in which the roll and the belt are run at different speeds and spaced apart from each other by the thickness of the dough pieces for allowing them to pass therebetween and causing them to curl.

Although most of the above-mentioned conveyors have been described as belt conveyors, some of them or all may be roller or chain conveyors, or any mix thereof.

Again, it should be noted that the forward conveyor (5) of the second conveyor assembly and the downstream conveyor (6) of the first conveyor assembly described above are not essential but are preferable for the present invention. If there is only a single conveyor in the second conveyor assembly, such a single conveyor naturally combines some of the features mentioned above in connection with the forward conveyor and rearward conveyor. For instance, the foremost end of such a single conveyor is provided with the curved end for allowing the dough pieces to fall onto the first conveyor or assembly in the proper manner.

In operation, a web of dough sheet (1) prepared beforehand is continuously supplied on the upstream conveyor (12) of the first conveyor assembly. The dough sheet (1) will be succesively cut by the first cutter (9) into two kinds of lengthwise series of dough pieces alternately arranged in lateral direction, of which one is series (3') of trapezoidal dough pieces interconnected head-to-tail and the other is series (4') of individually separated trapezoidal dough pieces (4). Individually cut trapezoidal dough pieces are positioned with the long bottoms (c) facing the direction of advancement (a) thereof, and the interconnected dough pieces of series (3') of trapezoidal are positioned such that each trapezoidal dough piece narrows in the direction of advancement (a) thereof.

When the leading end of the dough sheet (1), which is successively cut by the first cutter (9) and conveyed by the upstream conveyor (12), approaches the rearward end (h) of the rearward conveyor (15), the operation of the machine is temporarily stopped and the leading end each series (3') is lifted manually or by suitable means to be placed on said rearward conveyor (15). Thereafter, the operation of the machine is resumed so that each of the series (3') are sidetracked upwardly onto the second conveyor assembly while each of the series (4') of individually separated dough pieces continues to be conveyed on the upstream conveyor below the rearward end (h) of the rearward conveyor (15).

In case the conveyor (15) is arranged to be pivotable about an axis of the roller (22) as illustrated in FIG. 5, the leading end of the dough sheet (1) can automatically be taken up by the rearward conveyor (15) and placed thereon when the strip reaches a position where it contacts the upper flight of the belt of the upstream conveyor (12), as shown by the broken line (15'). It is clear that said leading end can readily be taken up by the rearward conveyor (15), since the conveyor (15) runs in the same direction as the upstream conveyor (12), and that if the rearward end (h) of the rearward conveyor (15) is substantially pointed, said leading end can more readily be taken up thereby.

Next, when the rearward end (h) is made to swing upwards about the axis of the roller (22) to take a position where it engages the second cutter (10), the individually cut trapezoidal dough pieces (4) in said leading end which are about to ride onto the rearward conveyor (15), are separated away by their own weights vertically from the series (3') to drop onto the upper flight of the conveyor (12) without being capable of progressing on the rearward conveyor (15). Also, some of the dough pieces (4) may ride onto the rearward conveyor (15) to be conveyed thereby, but they can be readily removed from the system by suitable guide means at appropriate places.

Consequently, only the series (3') is made to advance on the rearward conveyor (15).

As the series (3') advances, the interconnecting portions (g) thereof will be severed by the second cutter (10), whereby individually cut trapezoidal dough pieces (3) are obtained. The cut dough pieces (3) will advance on the rearward conveyor (15) and be transferred onto the forward conveyor (5).

Figure 6:
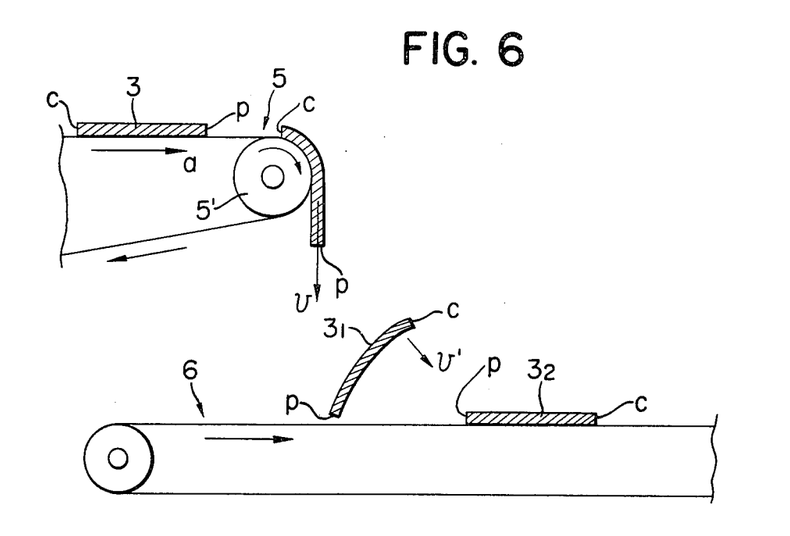
FIG. 6 is a diagramatic side view of a portion of the apparatus, showing the various states of the trapezoidal dough pieces being transferred from a conveyor onto another conveyor positioned underneath.
Figure 7:
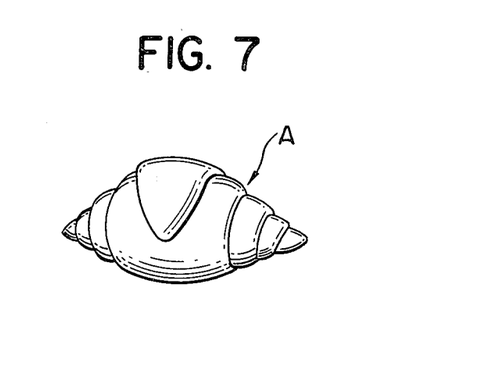
FIG. 7 is a perspective view of a product obtained by a preferred embodiment of the apparatus.

The trapezoidal dough pieces (3) are made to fall around the curved end formed by the end roller (5') of the rearward conveyor (5), while reversing their orientation as shown in FIG. 6, and they land on the downstream conveyor (6) so as to be oriented in the same direction as the trapezoidal dough pieces (4), with the bases or long bottoms (f) of all the trapezoids positioned forwardly or in the direction of advancement (a) of the dough sheet (1).

This phenomenon can be brought about due to the fact that, as shown in FIG. 6, when the trapezoidal dough piece (3) on the conveyor (5) is about to fall from the curved end portion formed by the roller (5'), the leading end portion (p) of the piece (3) depends therefrom due to the plasticity of dough material substantially in the vertical direction shown by the arrow (v) by gravity. As the falling action continues, the gravity acting on the dough piece (3) overcomes the frictional resistance produced between the piece (3) and the curved surface of the end portion of the belt of the conveyor (5), and thus the dough piece (3) tends to slide on the curved surface to fall downwardly with accelerated speeds. The accelerated falling motion will increase the centrifugal force generated on the trailing end portion (c) of the trapezoidal dough piece (3) when it moves around the curved surface, and thus the trailing end portion (c) will be effectively forced away from the curved surface while forwardly inclining away from the vertical direction (v), during which the leading end portion of the piece (3) progresses substantially vertically. Since the trailing end portion of the piece (3), while falling, has an inertial force in the direction shown by the arrow (v') when the top (p) of the piece (3) is about to contact the conveyor (6), the piece (3) will assume a position ($3_1$) and then ride on the upper flight of the conveyor (6) in a position ($3_2$) shown in FIG. 6, where the base or bottom (c) of the trapezoidal dough piece (3) faces in the direction of advancement of the dough sheet (1), which position ($3_2$) is the same as that of the dough pieces (4).

According to experiments, it was recognized that a stable reversing operation of the dough pieces (3) was obtained when the end roller (5') has a maximum radius as long as twice the longitudinal length of the trapezoidal dough piece (3) and a minimum radius as short as one-tenth thereof. As to the distance of fall of the dough piece, it was learned that it is preferable to set the distance at one and a half to three times the longitudinal length of the trapezoidal dough piece (3). Further, as to the conveying speed of the conveyor (5), it was found that a wide range of speed of from 1 to 100 meters per minute was sufficiently effective.

When the trapezoidal dough pieces (3) are transferred from the conveyor (5) onto the conveyor (6), they can ride successively onto the upper flight of the conveyor (6) without overlapping the trapezoidal dough pieces (4) fed from the upstream conveyor (12) directly onto the downward conveyor (6) by suitably controlling the conveying speed and/or the length of the upper flight of the forward conveyor (5) and the conveying speed of the downstream conveyor (6), which in this instance is required to be more than twice that of the upstream conveyor (12). Thus, the dough pieces (3) and (4) can be prevented from interfering with each other, and they can be readily rolled up from the bases or long bottoms (c) thereof by the roll-up device (7) such as a chain-like net explained above, without interference therebetween, thereby to form rolled masses (A) spiral in cross-section.

Depending upon the case, the trapezoidal dough pieces may be aligned on the downstream conveyor (6) so as to partially overlap each other to present a scale-like appearance. Even in this case, the dough pieces can be rolled up using a belt and roller assembly as stated above, by adjusting and increasing the speeds of the belt and roller in the assembly so as to pick up only the foremost dough pieces and roll them up before the subsequent dough pieces arrive at the assembly for rolling up.

Although the preferred embodiment of the present invention has been described such that the trapezoidal dough pieces (3) and (4) are both aligned on the downstream conveyor (6) so that the long bottoms (c) of the trapezoids face in the forward direction (a), it should be noted that the present invention contains the case of producing the trapezoidal dough pieces of the same orientation with the short tops (p) of the trapezoids facing in the forward direction (a). In this instance, it is apparent that a first cutter must be arranged so as to obtain a cut pattern from the dough sheet which is in the reversed configuration of what is shown in FIG. 3.

What we claim is:
1. An apparatus for producing from a sheet of dough a plurality of trapezoidal dough pieces having the same orientation, comprising a first conveyor assembly for conveying the dough sheet and having at least one conveyor arranged substantially horizontally, a first rotatable cylindrical cutter positioned on said first conveyor assembly in engagement therewith, said cutter being provided on the cylindrical surface thereof with blades adapted to cut from the dough sheet two kinds of lengthwise series of dough pieces, a first series consisting of trapezoidal dough pieces of the same orientation and interconnected head-to-tail and a second series consisting of dough pieces alongside said first series but aligned in reverse orientation and separated from each other, a second conveyor assembly positioned downstream of said first cylindrical cutter and spaced above said first conveyor assembly by at least the thickness of the dough pieces, said second conveyor assembly comprising at least one conveyor and including a forward portion provided at the foremost end thereof with a surface curved in cross-section and adapted to receive said interconnected dough pieces of said first series, and a rearward portion the upper portion of which is inclined upwardly in the downstream direction, and a second rotatable cylindrical cutter positioned on said second conveyor assembly in engagement therewith and provided on the cylindrical surface thereof with blades adapted to cut the interconnecting portions of the interconnected dough pieces in said first series to separate them from each other, the foremost end of said second conveyor assembly being at a level relative to that of said first conveyor assembly so that the trapezoidal dough pieces separated by said second cutter and conveyed by said second conveyor assembly can fall from said foremost end onto said first conveyor assembly in a manner reversing their orientation, the conveying speeds of the first and the second conveyor assemblies being arranged to be the same at least in the range between an area of the first conveyor assembly engaging the first cutter and an area of the second conveyor assembly engaging the second cutter.

2. An apparatus according to claim 1, including support plates provided underneath said first and second conveyor assemblies, respectively, to ensure the cutting effects of said respective cutters.

3. An apparatus according to claim 1, the blades of said first cutter being configured such that the trapezoidal dough pieces in said first series cut thereby have the shorter bottom sides of the trapezoids positioned facing in the direction of advancement of the dough sheet.

4. An apparatus according to claim 3, further comprising a roll-up device positioned at a downstream portion of the first conveyor assembly to extend transversely thereof and forwardly of said second conveyor assembly, thereby to roll up the trapezoidal dough pieces carried by the first conveyor assembly into rolled masses spiral in cross-section.

5. An apparatus according to claim 1, including means for guiding only the interconnected dough pieces on said first series onto said second conveyor assembly while the separated dough pieces of said second series are conveyed on said first conveyor assembly.

6. An apparatus according to claim 2, said rearward portion of said second conveyor assembly being pivotably mounted such that the rearward end thereof can move between a first position contacting said first conveyor and a second position spaced therefrom for said rearward portion to engage said second cutter, whereby when said rearward end takes the former position, it can automatically take up the leading end of the dough sheet which is successively cut by said first cutter and conveyed by said first conveyor assembly, so that said leading end can ride onto said second conveyor assembly, and when said rearmost end is raised upwardly to take the latter position, the separated dough pieces which have been taken up by but not substantially ridden onto said conveyor assembly, are separated away by their own weight from the interconnected dough pieces in said first series to fall onto said first conveyor assembly to be conveyed thereby, and only the interconnected dough pieces can be conveyed on said second conveyor assembly.

7. An apparatus according to claim 6, the rearward end of said rearward portion of said second conveyor assembly being substantially pointed to facilitate taking up of the leading ends of the dough sheet.

8. An apparatus according to any of claims 1 or 5 to 7, said first conveyor assembly consisting of an upstream conveyor having portions thereof positioned under said rearward portion of said second conveyor assembly and engaging said first cutter, and a downstream conveyor positioned downstream of said upstream conveyor to receive the dough pieces cut by said first cutter, the conveying speed of said downstream conveyor being faster than that of said upstream conveyor.

9. An apparatus according to claim 8, the conveying speed of said downstream conveyor being more than twice that of said upstream conveyor.

10. An apparatus according to claim 8, said second conveyor assembly consisting of a rearward conveyor and a forward conveyor having a speed as least as fast as that of said rearward conveyor.

11. An apparatus according to claim 10, said foremost end of said second conveyor assembly being positioned above said downstream conveyor; and at least one of the conveying speed, the length of said forward conveyor and the conveying speed of said downstream conveyor being adjusted in such a manner that the trapezoidal dough pieces separated by said second cutter and successively fallen from said forward conveyor and onto said downstream conveyor with their orientation being reversed can be prevented substantially from overlapping the trapezoidal dough pieces successively fed from said upstream conveyor onto said downstream conveyor.

12. An apparatus according to claim 11, said second conveyor assembly consisting of a rearward conveyor and a forward conveyor having a speed as least as fast as that of said rearward conveyor.

* * * * *